(12) United States Patent
Xu et al.

(10) Patent No.: US 12,213,031 B2
(45) Date of Patent: *Jan. 28, 2025

(54) POINT TO POINT AND POINT TO MULTIPOINT SWITCHING WITH SERVICE CONTINUITY FOR BROADCAST AND MULTICAST SERVICE

(71) Applicant: Apple Inc., Cupertino, CA (US)

(72) Inventors: Fangli Xu, Beijing (CN); Naveen Kumar R. Palle Venkata, San Diego, CA (US); Haijing Hu, Beijing (CN); Dawei Zhang, Saratoga, CA (US); Murtaza A. Shikari, Mountain View, CA (US); Srirang A. Lovlekar, Cupertino, CA (US); Srinivasan Nimmala, San Jose, CA (US); Sarma V. Vangala, Campbell, CA (US); Yuqin Chen, Shenhzen (CN); Zhibin Wu, Los Altos, CA (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,582

(22) Filed: Sep. 11, 2023

(65) Prior Publication Data

US 2023/0421999 A1 Dec. 28, 2023

Related U.S. Application Data

(63) Continuation of application No. 17/437,826, filed as application No. PCT/CN2020/122819 on Oct. 22, 2020, now Pat. No. 11,800,328.

(51) Int. Cl.
*H04W 76/10* (2018.01)
*H04L 1/1607* (2023.01)
*H04W 4/06* (2009.01)

(52) U.S. Cl.
CPC ............ *H04W 4/06* (2013.01); *H04L 1/1642* (2013.01); *H04W 76/10* (2018.02)

(58) Field of Classification Search
CPC ........ H04W 4/06; H04W 76/10; H04L 1/1642
(Continued)

(56) References Cited

U.S. PATENT DOCUMENTS

| 11,800,328 | B2* | 10/2023 | Xu ........................... H04W 4/06 |
| 2019/0215694 | A1* | 7/2019 | Rubin ..................... H04W 4/90 |
| 2019/0327582 | A1 | 10/2019 | Lee | |

FOREIGN PATENT DOCUMENTS

| CN | 102821362 | 12/2012 |
| CN | 108886669 | 11/2018 |
| CN | 109982266 | 7/2019 |
| EP | 1507364 | 2/2005 |
| EP | 3723395 | 10/2020 |
| WO | 2018084194 | 5/2018 |

OTHER PUBLICATIONS

Extended European Search Report for EP Patent Application No. 23199752.9; Jan. 8, 2024.

(Continued)

*Primary Examiner* — Christopher R Crompton
(74) *Attorney, Agent, or Firm* — Kowert, Hood, Munyon, Rankin & Goetzel, P.C.

(57) ABSTRACT

This disclosure relates to techniques for supporting switching between point to point and point to multipoint delivery with service continuity for broadcast and multicast services in a wireless communication system. A cellular base station and a wireless device may establish a wireless link. The cellular base station may provide information configuring an over the air delivery type with which to receive a broadcast or multicast service, which may be received by the wireless device. The cellular base station may transmit the service using the configured delivery type, and the wireless device may correspondingly receive the service. The cellular base station may provide information configuring the wireless (Continued)

device to switch to a different over the air delivery type, with service continuity. The cellular base station may then transmit the service using that delivery type, and the wireless device may correspondingly receive the service.

20 Claims, 9 Drawing Sheets

(58) Field of Classification Search
USPC .......................................................... 370/329
See application file for complete search history.

(56) References Cited

OTHER PUBLICATIONS

Vivo "MBS Service Continuity for RRC Connected UE", 3GPP TSG-RAN WG2 Meeting #111e R2-2007035, Aug. 17, 2020.

Mediatek Inc. "UE Reception Model of MBS Radio Bearer and its Dynamic PTM/PTP switch", 3GPP TSG-RAN WG2 Meeting #111e R2-2006575, Aug. 17, 2020.
International Search Report for PCT Patent Application No. PCT/CN2020/122819; Jul. 21, 2021.
OPPO "Dynamic PTM and PTP switching with service continuity"; 3GPP TSG-RAN WG2 Meeting #111-e R2-2006803; Aug. 28, 2020.
Intel Corp "Dynamic switch between PTM and PTP for service continuity"; 3GPP RSG-RAN Wg2 Meeting #111-8 R2-2007637; Aug. 28, 2020.
Apple "PTM PTP switch with MBS service continuity"; 3GPP TSG-RAN WG2 Meeting #112-e R2-2009495; Oct. 23, 2020.
Extended European Search Report for 20958177.6; May 23, 2024.
Mikko et al. "5G Radio Access Networks: Enabling Efficient Point-to-Multipoint Transmissions"; IEEE Vehicular Technology Magazine vol. 14, No. 4; Dec. 2019.
Office Action for CN Patent Application No. 202080106522.3; Sep. 13, 2024.

* cited by examiner

POINT TO POINT AND POINT TO MULTIPOINT SWITCHING WITH SERVICE CONTINUITY FOR BROADCAST AND MULTICAST SERVICE

PRIORITY CLAIM INFORMATION

This application is a continuation of U.S. patent application Ser. No. 17/437,826, entitled "Point to Point and Point to Multipoint Switching with Service Continuity for Broadcast and Multicast Service," filed Sep. 9, 2021, which is a national stage application of International Application No. PCT/CN2020/122819, filed on Oct. 22, 2020, titled "Point to Point and Point to Multipoint Switching with Service Continuity for Broadcast and Multicast Service", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for supporting point to point and point to multipoint switching with service continuity for broadcast and multicast services in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™ etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for supporting point to point and point to multipoint switching with service continuity for broadcast and multicast services in a wireless communication system.

According to the techniques described herein, a cellular base station may be able to decide to switch the over the air delivery type for a broadcast or multicast service that is being provided to a wireless device, for example from point-to-multipoint to point-to-point, or vice versa. Such switching may be performed to increase service availability, to increase service reliability, to increase network spectrum use efficiency, and/or for any of a variety of other possible reasons.

To perform such switching, the cellular base station may acquire context information for the broadcast or multicast service from the wireless device. This information may include the next packet sequence number of the broadcast or multicast service for the wireless device, and may possibly also include any missing packet sequence numbers for the broadcast or multicast service for the wireless device.

Additionally, the cellular base station may configure the wireless device to switch delivery types, potentially including providing configuration information for a protocol stack associated with the new delivery type, and service continuity information that may facilitate provision of the protocol stack associated with the new delivery type with context information (e.g., the next packet sequence number, and possibly also any missing packet sequence numbers) for the broadcast or multicast service. For example, the service continuity information could directly include the context information with which to provision the protocol stack associated with the new delivery type. Alternatively, the service continuity information could include information facilitating transfer of such information by the wireless device from a protocol stack associated with the original delivery type to the protocol stack associated with the new delivery type.

Thus, using such configuration and service continuity information, the cellular base station and the wireless device may be to continue transmitting and receiving the broadcast or multicast service via the new delivery type.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
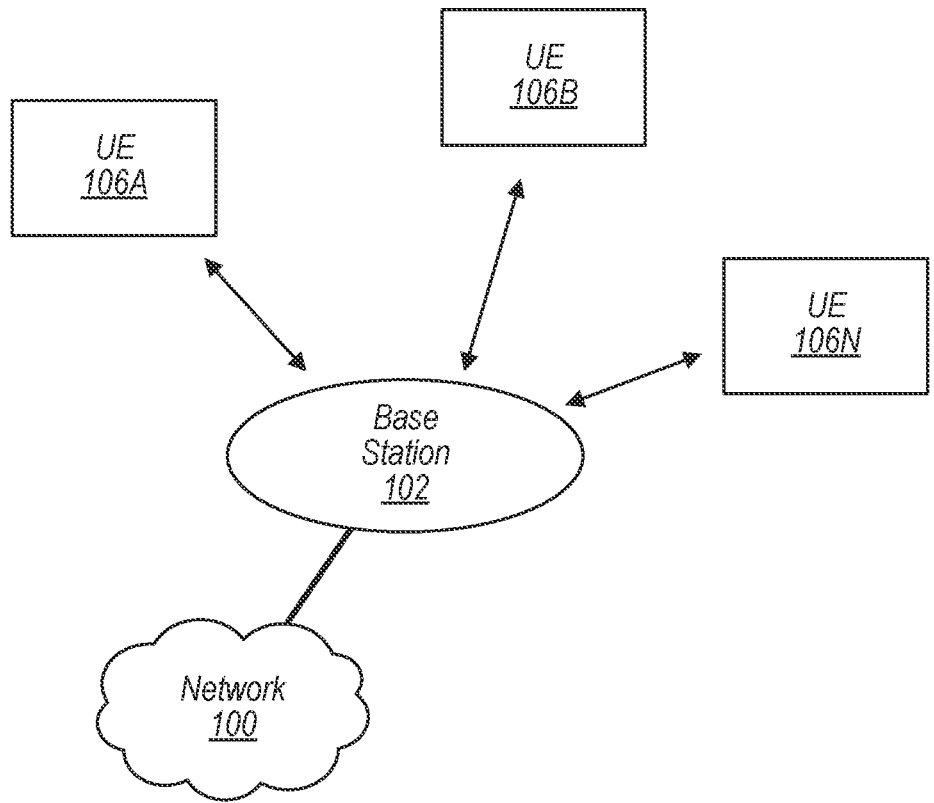
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
NW: Network
GSM: Global System for Mobile Communication
UMTS: Universal Mobile Telecommunication System
LTE: Long Term Evolution
NR: New Radio
RAN: Radio Access Network
CN: Core Network
TX: Transmission/Transmit
RX: Reception/Receive
RAT: Radio Access Technology
TRP: Transmission-Reception-Point
RRC: Radio Resource Control
MBMS: Multimedia Broadcast Multicast Service
TMGI: Temporary Mobile Group Identity
NAS: Non Access Stratum
AS: Access Stratum Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
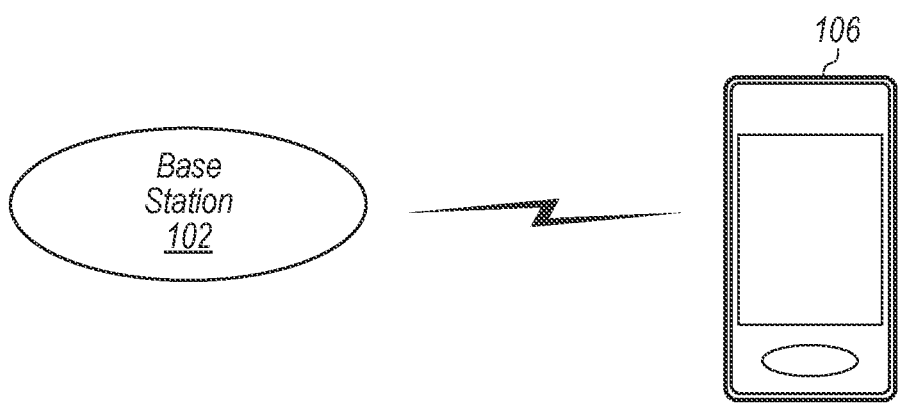
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform point to point and point to multipoint switching with service continuity for broadcast and multicast services, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
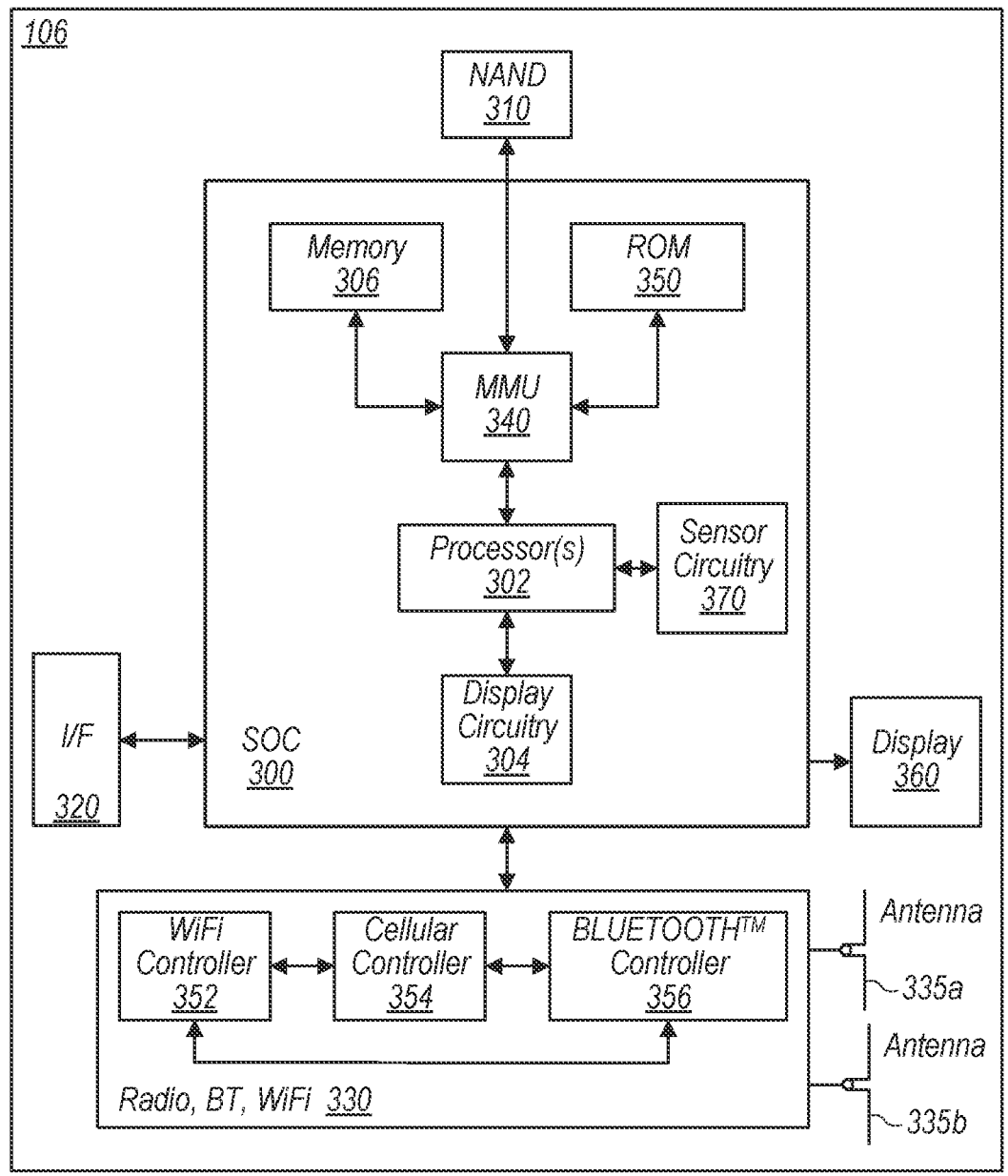
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for performing switching between point to point and point to multipoint delivery with service continuity for broadcast and multicast services, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform point to point and point to multipoint switching with service continuity for broadcast and multicast services according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
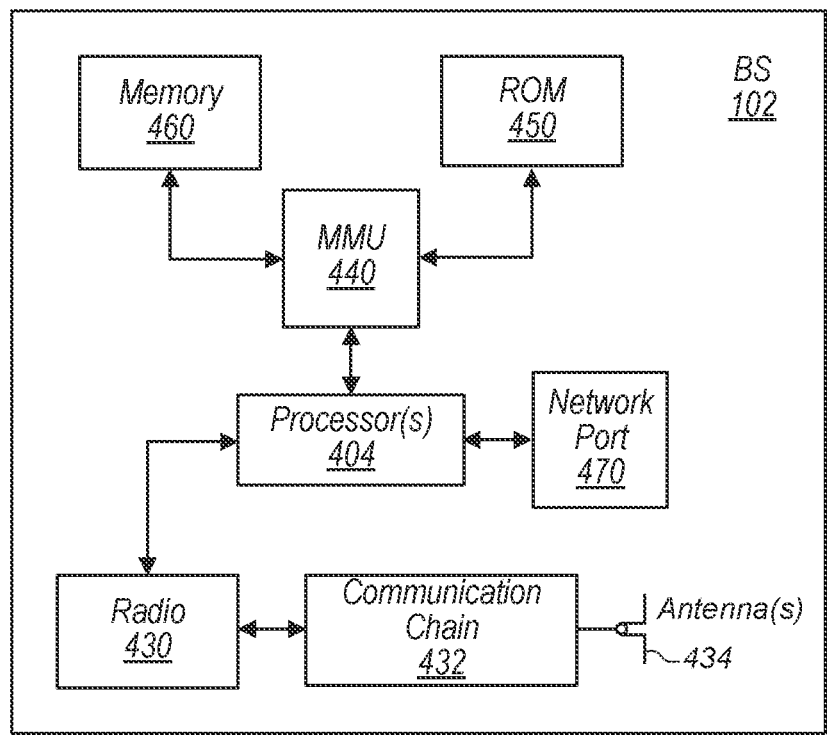
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
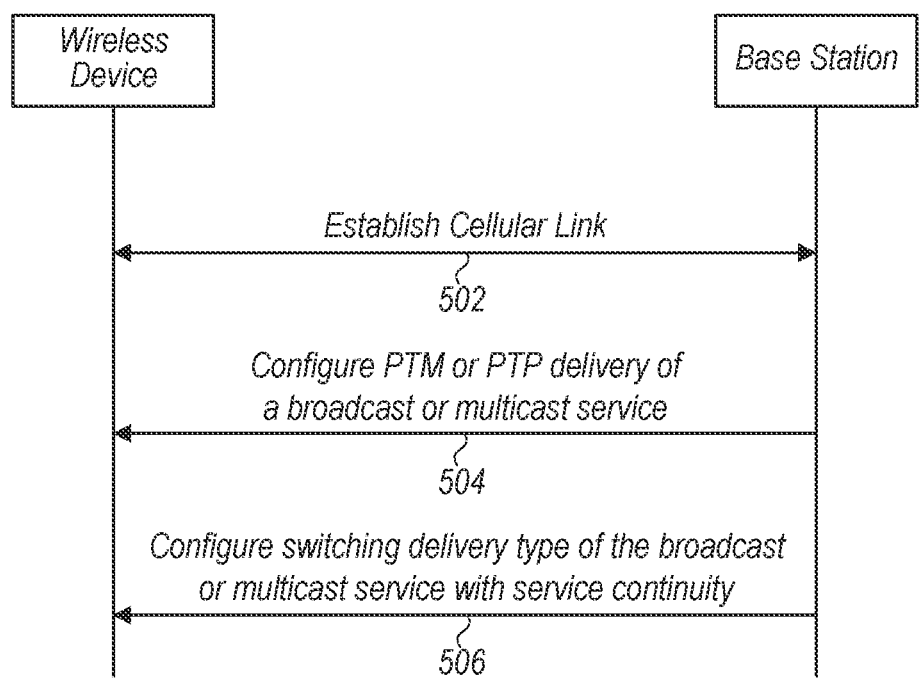
FIG. 5 is a flowchart diagram illustrating aspects of an exemplary possible method for supporting switching between point to multipoint and point to point delivery of a broadcast or multicast service with service continuity in a wireless communication system, according to some embodiments.

FIG. 5—PTP and PTM Switching with Service Continuity for Broadcast and Multicast Services Wireless communication is being used for an increasingly broad set of use cases. Provision of broadcast and multicast services, such as for multimedia content and/or any of various other possible purposes, may represent one such use case of increasing interest. As one example, 3GPP supports and is further developing techniques relating to provision of multimedia broadcast multicast services (MBMS).

It may be beneficial, at least in some instances, to increase the flexibility with which such services can be delivered. For example, as one possibility, it may be useful to provide support for a mechanism to switch between possible over the air delivery mechanisms without service interruption, such as by providing techniques for supporting switching between point to point and point to multipoint delivery with service continuity for broadcast and multicast services. Accordingly, FIG. 5 is a flowchart diagram illustrating such a method for supporting point to point and point to multipoint switching with service continuity for broadcast and multicast services in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted.

Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication, or for any of various other possible reasons), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the cellular base station may configure the wireless device for receiving a broadcast or multicast service via an over-the-air delivery type, such as one of one of point to multipoint (PTM) or point to point (PTP) delivery. Configuring PTM or PTP delivery may include providing configuration information for a PTM or PTP protocol stack (e.g., respectively) of the wireless device for the broadcast or multicast service. This may include configuring any or all of a media access control (MAC) logical channel (e.g., a multicast traffic channel (MTCH) for PTM or a dedicated traffic channel (DTCH) for PTP), a radio link control (RLC) bearer, a packet data convergence protocol (PDCP) data radio bearer (DRB), a service data application protocol (SDAP) layer, a Quality of Service (QoS) flow, and/or any of various other possible aspects, at least according to some embodiments.

The wireless device may receive the broadcast or multicast service using the configured delivery mechanism, e.g., in accordance with the configuration information provided by the cellular base station.

In 506, the cellular base station may configure the wireless device to switch delivery type of the broadcast or multicast service, with service continuity. For example, the cellular base station may configure the wireless device to switch from PTM delivery to PTP delivery, or to switch from PTP delivery to PTM delivery. Configuring the new delivery mechanism may include providing configuration information for a protocol stack of the wireless device associated with the new delivery type for the broadcast or multicast service. Thus, if the original delivery type was PTM and the new delivery type is PTP, the configuration information for switching from PTM to PTP may include configuration information for a PTP protocol stack, while if the original delivery type was PTP and the new delivery type is PTM, the configuration information for switching from PTP to PTM may include configuration information for a PTM protocol stack.

The cellular base station may determine to switch the delivery type for the wireless device for any of a variety of possible reasons. For example, as one possibility, if the cellular base station provides PTM delivery for the broadcast or multicast service on a bandwidth part (BWP) that is not active for the wireless device, the cellular base station might determine to switch from PTM delivery to PTP delivery, e.g., so that the wireless device may be able to continue receiving the broadcast or multicast service using its current active BWP. As another possibility, the cellular base station might determine to switch from PTM delivery to PTP delivery based at least in part on an increase in radio resource availability, e.g., so that the wireless device may be able to benefit from potentially more reliable PTP delivery. As still another possibility, the cellular base station might determine to switch from PTP delivery to PTM delivery based at least in part on a decrease in radio resource availability, e.g., so that the content delivery can be performed in a more spectrum efficient manner. Variations on such reasons, and/or various other reasons for the cellular base station to determine to switch delivery types for the wireless device, are also possible.

At least in some instances, the cellular base station may request context information from the wireless device (e.g., from the protocol stack of the wireless device associated with the original delivery mechanism) in conjunction with switching delivery types, and the wireless device may provide the context information to the cellular base station in response to the request. According to some embodiments, the context information may include at least the next packet sequence number of the broadcast or multicast service, and possibly one or more missing packet sequence numbers (e.g., if there are any missing packets, and/or if the new delivery type includes support for wireless device specific packet retransmissions, such as may be the case for PTP delivery). Such information may be requested and provided separately from providing configuration information for the delivery type switch, or may be exchanged as part of a configuration information communication exchange. For example, the cellular base station may request a status report (which may include the context information for the broadcast or multicast service for the wireless device) from the wireless device, and may receive the status report, prior to providing configuration information configuring the wireless device to switch delivery type of the broadcast or multicast service. As another example, the cellular base station may request context information for the broadcast or multicast service for the wireless device when providing the configuration information configuring the wireless device to switch delivery type of the broadcast or multicast service, and may receive the context information in response to the configuration information, for example when the wireless device acknowledges the new configuration, e.g., as part of a RRC reconfiguration exchange between the cellular base station and the wireless device.

The configuration information for the switch in delivery type may include service continuity information for supporting continuation of reception of the broadcast or multicast service (e.g., without interruption) across the switch in over-the-air delivery type. The service continuity information may include any of various possible types of information. At least in some instances, the service continuity information may provide the wireless device with the ability to provision the protocol stack for the new delivery type with context information from the previous delivery type, such as the next packet sequence number of the broadcast or multicast service, and possibly one or more missing packet sequence numbers (e.g., if there are any missing packets, and/or if the new delivery type includes support for wireless device specific packet retransmissions, such as may be the case for PTP delivery).

For example, as one possibility, the service continuity information may directly include such context information, e.g., in a scenario in which the cellular base station requested and received such context information from the wireless device (e.g., from the protocol stack of the wireless device associated with the original delivery mechanism) prior to providing the configuration information for the switch in delivery type. In such a case, the wireless device may accordingly provision the protocol stack associated with the new delivery type with the context information for the broadcast or multicast service received from the cellular base station as part of the service continuity information.

As another possibility, the service continuity information may include an indication of a radio bearer (e.g., a radio bearer identifier) for the broadcast or multicast service for the wireless device. For example, the cellular base station may indicate a PDCP DRB ID number for the PDCP DRB associated with the original delivery type to the wireless device. In such a case, the wireless device may determine which context information (e.g., in case the wireless device has multiple such protocol stack instances) to transfer to the protocol stack associated with the new delivery type based at least in part on the indication of the radio bearer for the broadcast or multicast service, and the wireless device may accordingly transfer the context information for the broadcast or multicast service from the protocol stack associated with the original delivery type to the protocol stack associated with the new delivery type.

As a still further possibility, the service continuity information may include an indication to enable service continuity for the broadcast or multicast service for the wireless device. For example, the cellular base station may a one bit indicator set to indicate to enable service continuity to the wireless device when configuring the delivery type switch. Such a technique may be possible, for example, if the wireless device has only one candidate radio bearer with which the delivery type switch could be associated. Thus, the wireless device may be able to determine which context information to transfer to the protocol stack associated with the new delivery type based at least in part on the indication to enable service continuity for the broadcast or multicast service (e.g., since there may be only one possible candidate protocol stack instance), and the wireless device may accordingly transfer the context information for the broadcast or multicast service from the protocol stack associated with the original delivery type to the protocol stack associated with the new delivery type.

The wireless device may receive the broadcast or multicast service using the configured (e.g., new) delivery mechanism in accordance with the configuration information provided by the cellular base station. This may include receiving the next packet sequence number for the broadcast or multicast service, e.g., which the wireless device may have determined directly or indirectly based on the service continuity information for the delivery type switch, as previously described herein. In the case of a switch from PTM delivery to PTP delivery in which one or more packets were missing at the wireless device, such missing packets may also be retransmitted by the cellular base station and received by the wireless device as part of the broadcast or multicast service reception, at least in some instances.

The cellular base station and the wireless device may perform such delivery type switching any number of times. For example, the cellular base station could determine to perform a further delivery type switch for the wireless device. In such a scenario, the cellular base station may provide further configuration information to the wireless device for the delivery type switch. For example, the cellular base station may again provide configuration information for a protocol stack of the wireless device associated with the configured delivery type for the broadcast or multicast service, and may include service continuity information for the delivery type switch. After such configuration, the wireless device may continue the broadcast or multicast service reception in accordance with the configured delivery type switch.

Thus, the method of FIG. 5 may be used to support switching between PTM and PTP delivery mechanisms with service continuity when providing broadcast and multicast services to wireless devices in a cellular communication system. Such techniques may be useful for increasing the flexibility with which such service provision can be provided, which may help improve service availability and/or reliability for wireless devices, among other possible benefits, at least according to some embodiments.

FIGS. 6-11 and Additional Information

FIGS. 6-11 illustrate further aspects that might be used in conjunction with the method of FIG. 5 if desired. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

In 3GPP LTE multimedia broadcast multicast service (MBMS), for one MBMS service transmission, it may be the case that the core network decides whether to perform the transmission in a unicast manner or in a multicast/broadcast manner, without flexibility to switch between delivery mechanisms during service delivery.

In 3GPP NR MBMS, it may be the case that for a given UE, the gNB may be able to dynamically decide whether to deliver multicast data by PTM or PTP (shared delivery).

Figure 6:
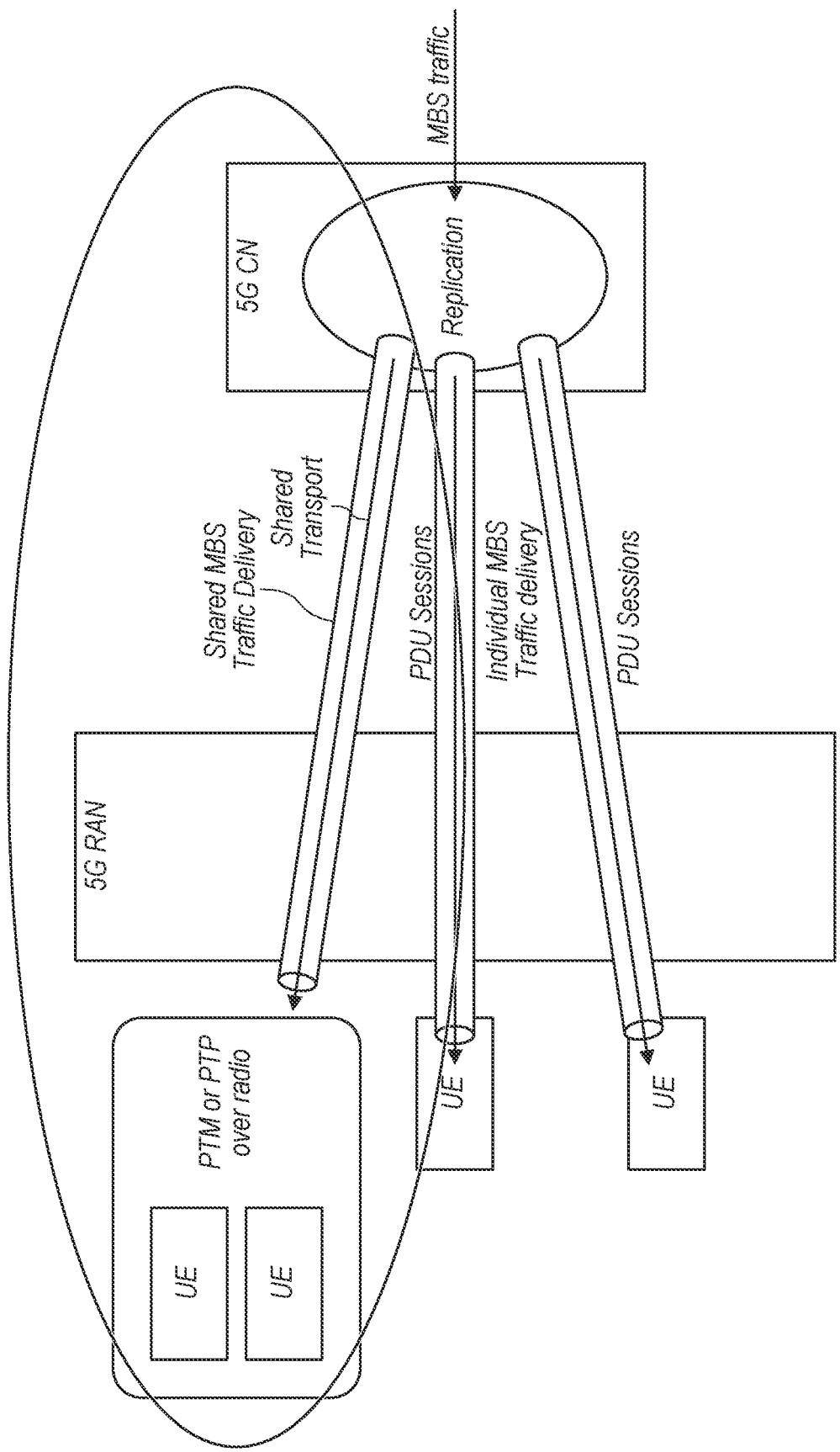
FIG. 6 illustrates exemplary aspects of a possible cellular network architecture in which multicast and broadcast service provision is supported, according to some embodiments.

FIG. 6 illustrates exemplary aspects of a possible cellular network architecture in which such multicast and broadcast service provision is supported, according to some embodiments. As shown, in the illustrated example scenario, for shared multicast/broadcast service (MBS) traffic delivery, the 5G core network may provide shared transport of a multicast or broadcast service to the 5G radio access network, which may in turn decide whether to provide PTM or PTP delivery to UEs served by the network over the radio access medium.

To enhance the network flexibility, for example to account for scenarios in which it may be beneficial for reliability, service availability, signaling efficiency, or for any of various other possible reasons, it may be useful to provide techniques for switching from PTM to PTP or vice versa with service continuity.

Figure 7:
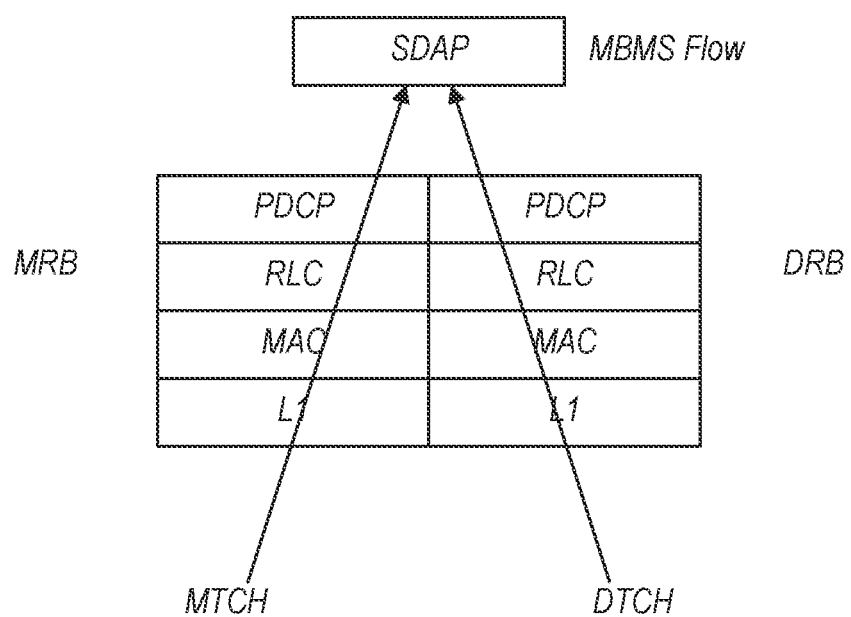
FIG. 7 illustrates exemplary aspects of a possible wireless device protocol stack that can support point to point or point to multipoint delivery of a broadcast or multicast service, according to some embodiments.

According to some embodiments, the user plane (UP) model of 3GPP MBMS reception may include separate media access control (MAC), radio link control (RLC), and packet data convergence protocol (PDCP) layers for PTM and PTP transmission. One service data application protocol (SDAP) entity may be configured per shared MBMS session, and this entity may be shared between PTP and PTM transmission. FIG. 7 illustrates exemplary aspects of such a UP model, according to some embodiments.

Accordingly, when the network configures PTP delivery for a MBMS transmission, the configuration may include one or more of a MAC logical channel (e.g., "LCH #1", which may be a dedicated traffic channel (DTCH) type of logical channel), a RLC bearer ("RLC ID #1"), a PDCP bearer ("PDCP #1") for the unicast transmission, and the SDAP entity for the shared MBMS session. The Quality of Service (QoS) flow may be the MBMS Q-flow.

When the network configures PTP delivery for a MBMS transmission, the configuration may include one or more of a MAC logical channel (e.g., "LCH #2", which may be a multicast traffic channel (MTCH) type of logical channel), a RLC bearer ("RLC ID #2"), a PDCP bearer ("PDCP #2") for the multicast transmission, and the SDAP entity for the shared MBMS session. The QoS flow may be the MBMS Q-flow.

For switching from PTM to PTP delivery, when the UE is configured for MBMS transmission via PTM (PDCP #2) transmission, the network may reconfigure the MBMS transmission via PTP transmission (PDCP #1), and may provide the PDCP #2's context for the initial context of the PDCP #1 transmission, to achieve service continuity and potentially lossless transmission during the switching.

There may be several options for providing the PDCP context to the wireless device for the switch from PTM to PTP delivery. As one such possibility, the network may obtain the next PDCP sequence number (SN) and any missing SNs for retransmission from the PDCP #2 of the wireless device and provide the next PDCP SN and any missing SNs for retransmission to the PTCP #1. As another such possibility, the network may provide an indication of the PDCP data radio bearer (DRB) ID for PDCP #2 to the wireless device, e.g., to facilitate PDCP #1 fetching the context information from PDCP #2 of the wireless device. As a still further possibility, the network may provide an indication that service continuity is enabled for the switch from PTM to PTP. At least according to some embodiments, such a scenario may similarly effectively facilitate PDCP #1 fetching the context information from PDCP #2 of the wireless device, as long as the UE only has one active multicast DRB.

Similar techniques may be used for switching from PTP to PTM delivery, at least according to some embodiments. As one possible difference, the PTM PDCP layer may not be provided with or may otherwise not obtain any missing SNs for the MBMS transmission, e.g., since it may be the case that UE specific data retransmission is not supported for PTM delivery.

FIGS. 8-11 are signal flow diagrams illustrating further details of various possible techniques for switching between PTM and PTP delivery of a broadcast or multicast service with service continuity, according to some embodiments.

Figure 8:
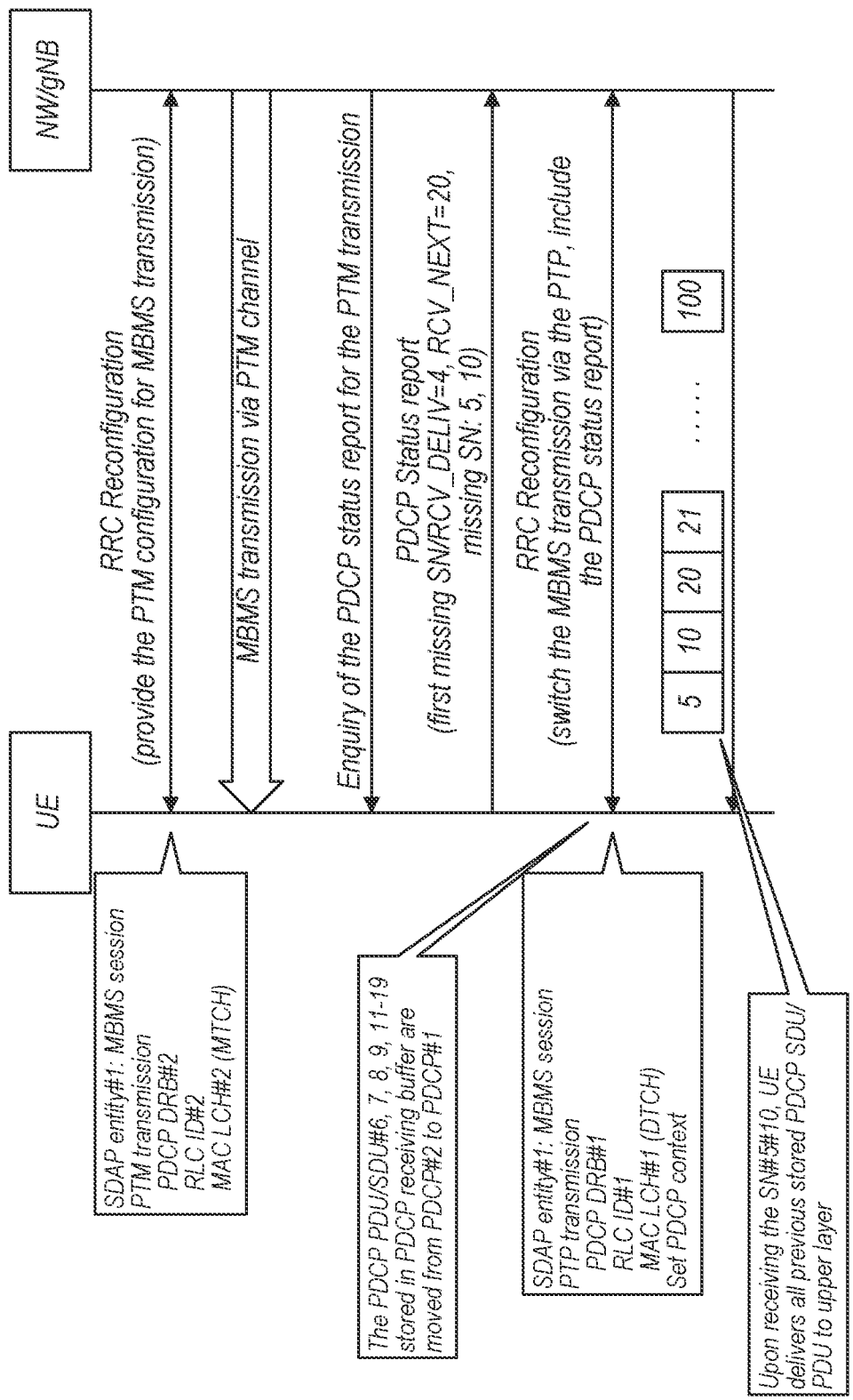
FIGS. 8-11 are signal flow diagrams illustrating aspects of exemplary possible techniques for switching between point to multipoint and point to point delivery of a broadcast or multicast service with service continuity, according to some embodiments.

In particular, FIG. 8 illustrates further aspects of an approach in which the PDCP context provided during the switch command includes the first received new PDCP SN and any missing PDCP SNs of the PTP DRB. In such a scenario, the network may trigger the UE to report the PTM PDCP status before triggering the switching, e.g., in order to acquire the PDCP context for PTM transmission from the UE. The UE may establish the PDCP #1/RLC #1/MAC LCH #1 for the PTP transmission. The UE may set the PDCP #1 variable in the receiving side according to the received PDCP context. The network may start the new data transmission from the first received PDCP SN, and may perform retransmissions for the missing PDCP packets.

Figure 9:
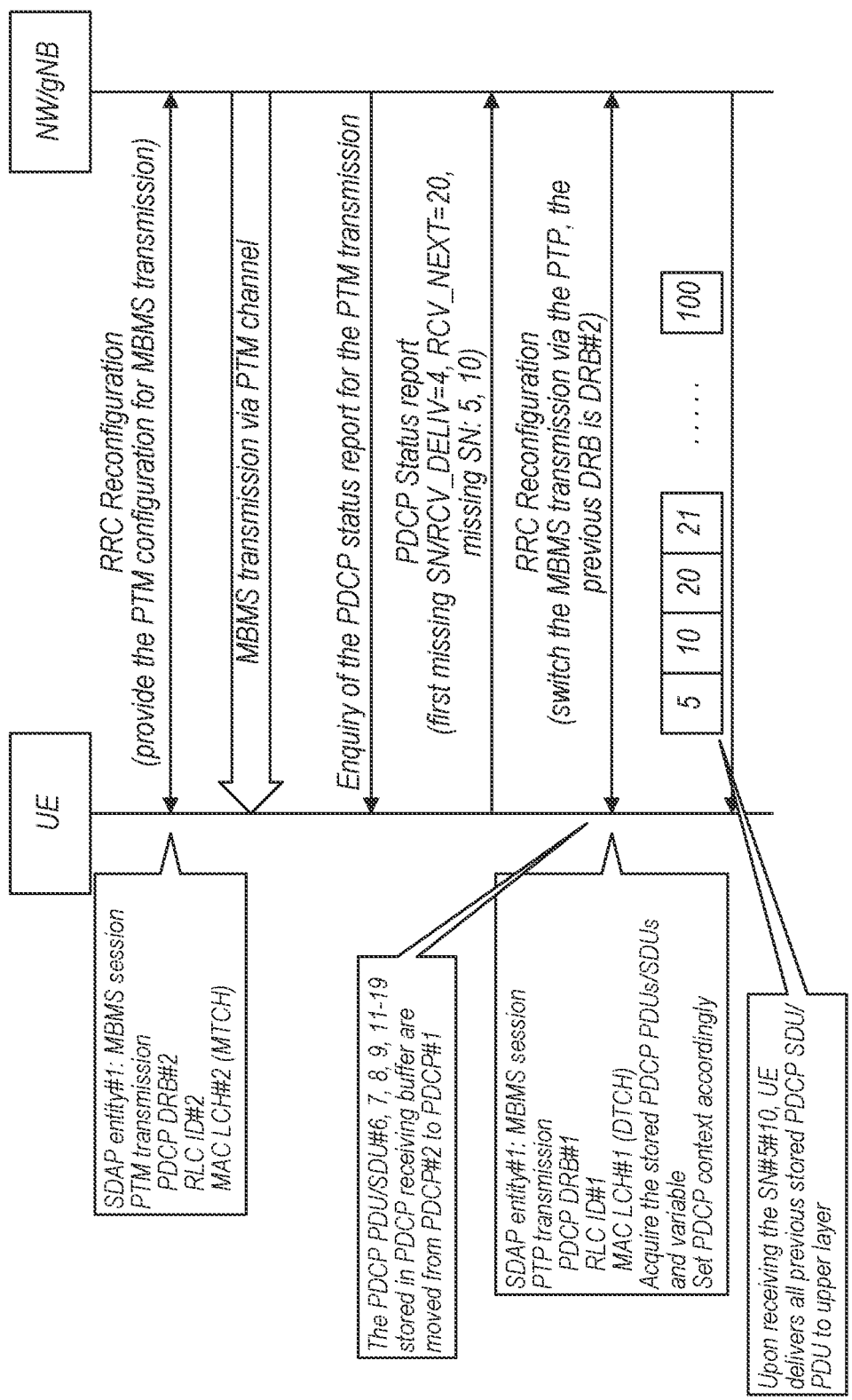

FIG. 9 illustrates further aspects of an approach in which the PDCP context during the switch command includes the previous transmitted PDCP DRB ID. In such a scenario, the network may trigger the UE to report the PTM PDCP status before triggering the switching, or alternatively when triggering the switching, e.g., in order to acquire the PDCP context for PTM transmission from the UE. The UE may establish the PDCP #1/RLC #1/MAC LCH #1 for the PTP transmission. The UE may acquire the PDCP receiving context and data from the previous PDCP #2, and may set the PDCP #1 variable in the receiving side accordingly. The network may start the new data transmission from the first received PDCP SN, and may perform retransmissions for the missing PDCP packets.

Figure 10:
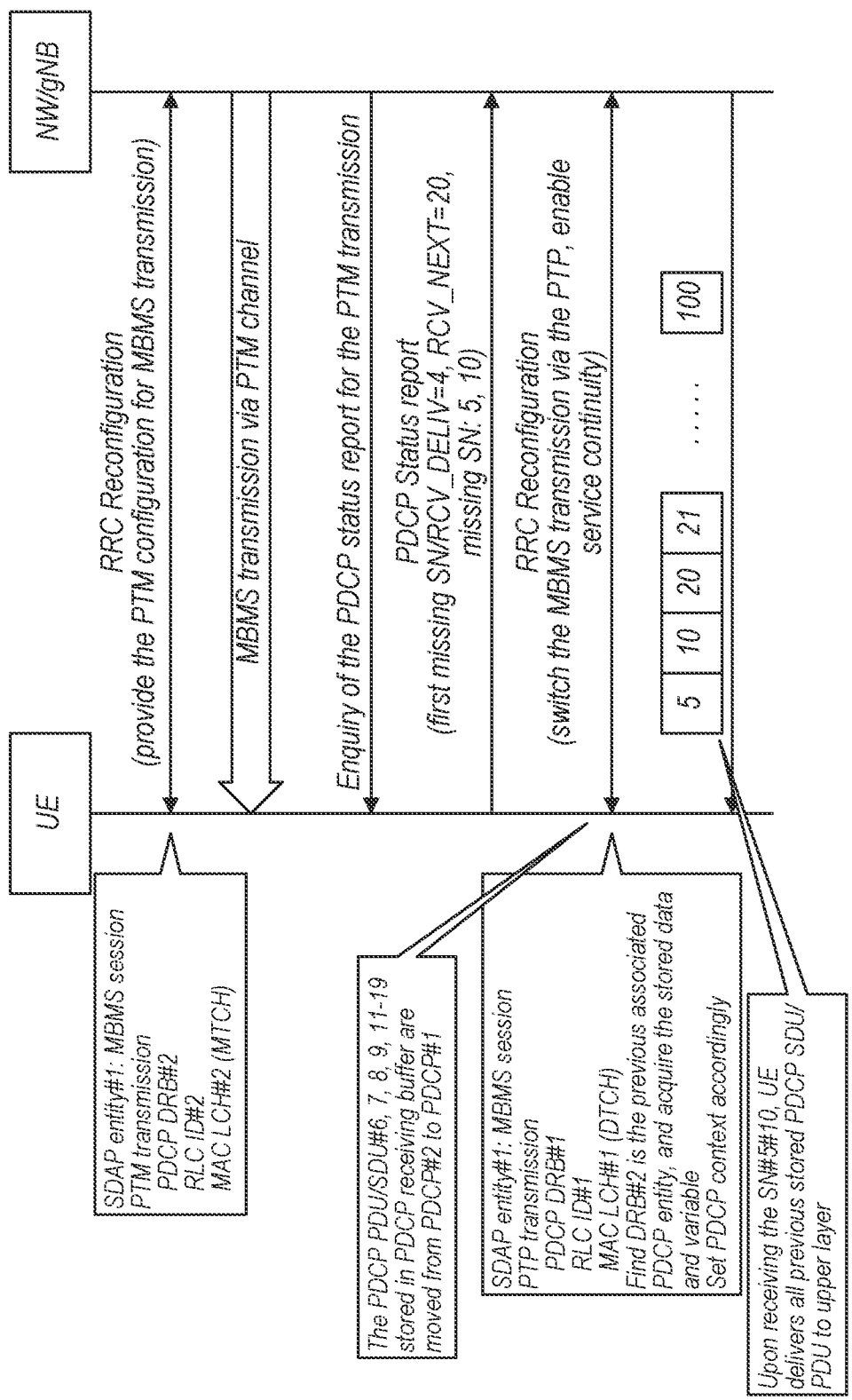

FIG. 10 illustrates further aspects of an approach in which the network indicates that service continuity is enabled for the MBMS bearer when providing the switch command. In such a scenario, the network may trigger the UE to report the PTM PDCP status before triggering the switching, or alternatively when triggering the switching, e.g., in order to acquire the PDCP context for PTM transmission from the UE. The UE may establish the PDCP #1/RLC #1/MAC LCH #1 for the PTP transmission. The UE may find the previously used PDCP #2 associated with the SDAP entity, may acquire the previous DRB's stored data and variable, and may set the PDCP #1 DRB context accordingly. The network may start the new data transmission from the first received PDCP SN, and may perform retransmissions for the missing PDCP packets.

Figure 11:
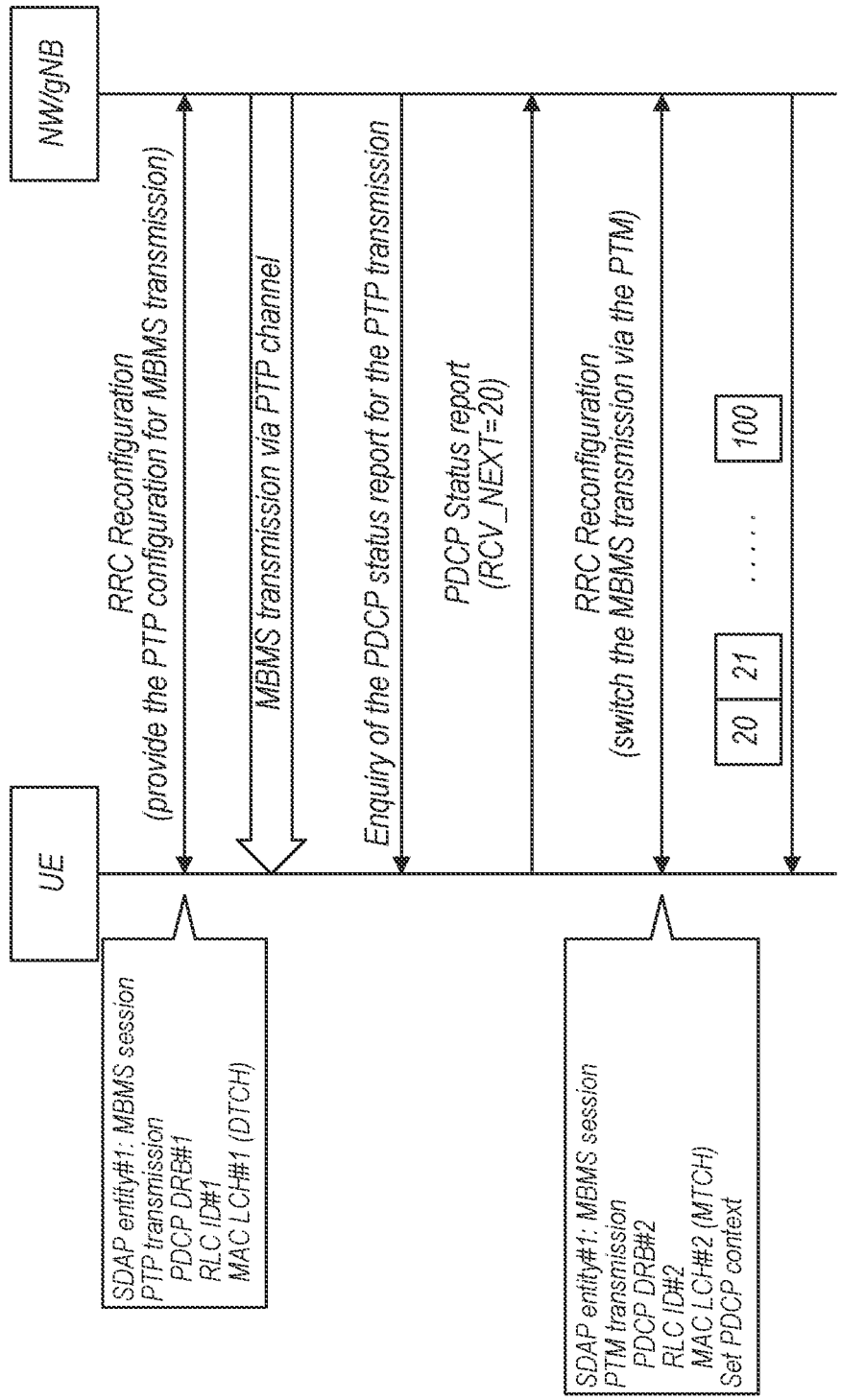

FIG. 11 illustrates further aspects of a simplified approach that can be used for PTP to PTM switching, according to some embodiments. In such a scenario, the network may trigger the UE to report the PTP PDCP status before triggering the switching, or alternatively when triggering the switching, e.g., in order to acquire the PDCP context for PTP transmission from the UE. The UE may establish the PDCP #2/RLC #2/MAC LCH #2 for the PTM transmission. Any of the techniques of FIGS. 8-10 may be used for facilitating the UE acquiring and setting context for the new protocol stack, e.g., including providing the PDCP context directly with the switch command, providing an indication of the PDCP DRB ID with the switch command, or providing an indication to enable service continuity. The UE may set the PDCP #2

DRB context accordingly. Note that for such PTP to PTM switching, it may be the case that the PDCP context does not include any missing packet SNs (e.g., since the network may not provide UE specific retransmission for any missing packets for PTM delivery). Accordingly, the network may start the new data transmission from the first received PDCP SN.

In the following further exemplary embodiments are provided.

One set of embodiments may include a baseband processor configured to perform operations comprising: establishing a wireless link with a cellular base station of a cellular network; receiving first configuration information from a cellular base station, wherein the first configuration information configures a first over-the-air delivery type for a broadcast or multicast service; receiving the broadcast or multicast service from the cellular base station using the first over-the-air delivery type in accordance with the first configuration information; receiving second configuration information from the cellular base station, wherein the second configuration information configures a second over-the-air delivery type for the broadcast or multicast service, wherein the second configuration information includes service continuity information for switching delivery of the broadcast or multicast service from the first over-the-air delivery type to the second over-the-air delivery type; and receiving the broadcast or multicast service from the cellular base station using the first over-the-air delivery type in accordance with the second configuration information.

According to some embodiments, the baseband processor is further configured to perform operations comprising: receiving a request for context information for the broadcast or multicast service from the cellular base station; and providing the context information for the broadcast or multicast service to the cellular base station; wherein the context information indicates a next packet sequence number for the broadcast or multicast service and one or more missing packet sequence numbers for the broadcast or multicast service.

According to some embodiments, the service continuity information includes an indication of a next packet sequence number for the broadcast or multicast service and an indication of one or more missing packet sequence numbers for the broadcast or multicast service.

According to some embodiments, the service continuity information includes a radio bearer identifier for the broadcast or multicast service, wherein the baseband processor is further configured to perform operations comprising: transferring context information for the broadcast or multicast service from a protocol stack associated with the first over-the-air delivery type to a protocol stack associated with the second over-the-air delivery type based at least in part on the radio bearer identifier for the broadcast or multicast service.

According to some embodiments, the service continuity information includes an indication to enable service continuity for the broadcast or multicast service, wherein the baseband processor is further configured to perform operations comprising: transferring context information for the broadcast or multicast service from a protocol stack associated with the first over-the-air delivery type to a protocol stack associated with the second over-the-air delivery type based at least in part on the indication to enable service continuity for the broadcast or multicast service.

According to some embodiments, the baseband processor is further configured to perform operations comprising: receiving third configuration information from the cellular base station, wherein the third configuration information configures the first over-the-air delivery type for the broadcast or multicast service, wherein the third configuration information includes service continuity information for switching delivery of the broadcast or multicast service from the second over-the-air delivery type to the first over-the-air delivery type; and receiving the broadcast or multicast service from the cellular base station using the first over-the-air delivery type in accordance with the third configuration information.

Another set of embodiments may include a wireless device, comprising: an antenna; a radio operably coupled to the antenna; and a processor operably coupled to the radio; wherein the wireless device is configured to: establish a wireless link with a cellular base station; receive information configuring the wireless device to receive a broadcast or multicast service using a first over-the-air delivery type; receive the broadcast or multicast service from the cellular base station using the first over-the-air delivery type; and receive information configuring the wireless device to switch to a second over-the-air delivery type.

According to some embodiments, the wireless device is further configured to: receive a request for context information for the broadcast or multicast service from the cellular base station; and provide the context information for the broadcast or multicast service to the cellular base station; wherein the context information indicates at least a next packet sequence number for the broadcast or multicast service for the wireless device.

According to some embodiments, the context information further indicates one or more missing packet sequence numbers for the broadcast or multicast service for the wireless device.

According to some embodiments, the information configuring the wireless device to switch to the second over-the-air delivery type with service continuity includes one or more of: an indication of a next packet sequence number for the broadcast or multicast service for the wireless device; an indication of one or more missing packet sequence numbers for the broadcast or multicast service for the wireless device; an indication of a radio bearer identifier for the broadcast or multicast service for the wireless device; or an indication to enable service continuity for the broadcast or multicast service for the wireless device.

According to some embodiments, the wireless device is further configured to: transfer context information for the broadcast or multicast service from a packet data convergence protocol (PDCP) layer of the wireless device configured for the first over-the-air delivery type to a PDCP layer of the wireless device configured for the second over-the-air delivery type based at least in part on the information configuring the wireless device to switch to the second over-the-air delivery type with service continuity.

According to some embodiments, the first over-the-air delivery type is point to point (PTP) delivery, wherein the second over-the-air delivery type is point to multipoint (PTM) delivery.

According to some embodiments, the first over-the-air delivery type is point to multipoint (PTM) delivery, wherein the second over-the-air delivery type is point to point (PTP) delivery.

Yet another set of embodiments may include a cellular base station, comprising: an antenna; a radio operably coupled to the antenna; and a processor operably coupled to the radio; wherein the cellular base station is configured to: establish a wireless link with a wireless device; provide first configuration information to the wireless device, wherein the first configuration information configures the wireless device to receive a broadcast or multicast service using a first over-the-air delivery type; provide the broadcast or multicast service to the wireless device using the first over-the-air delivery type in accordance with the first configuration information; determine to switch to using a second over-the-air delivery type to provide the broadcast or multicast service; provide second configuration information to the wireless device, wherein the second configuration information configures the wireless device to receive the broadcast or multicast service using the second over-the-air delivery type; and provide the broadcast or multicast service to the wireless device using the second over-the-air delivery type in accordance with the second configuration information.

According to some embodiments, the cellular base station is further configured to: request context information for the broadcast or multicast service from the wireless device; receive the context information for the broadcast or multicast service from the wireless device; wherein the context information indicates at least a next packet sequence number for the broadcast or multicast service for the wireless device.

According to some embodiments, the second configuration information includes service continuity information for switching delivery of the broadcast or multicast service from the first over-the-air delivery type to the second over-the-air delivery type.

According to some embodiments, the service continuity information includes an indication of a next packet sequence number for the broadcast or multicast service for the wireless device and an indication of one or more missing packet sequence numbers for the broadcast or multicast service for the wireless device.

According to some embodiments, the service continuity information includes a radio bearer identifier for the broadcast or multicast service for the wireless device.

According to some embodiments, the service continuity information includes an indication to enable service continuity for the broadcast or multicast service for the wireless device.

According to some embodiments, the cellular base station is further configured to: determine to switch back to using the first over-the-air delivery type to provide the broadcast or multicast service; provide third configuration information to the wireless device, wherein the third configuration information configures the wireless device to receive the broadcast or multicast service using the first over-the-air delivery type; and provide the broadcast or multicast service to the wireless device using the first over-the-air delivery type in accordance with the third configuration information.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to perform operations comprising:
receiving first configuration information from a cellular base station of a cellular network, wherein the first configuration information is associated with a first over-the-air delivery type for a multicast service;
receiving first data of the multicast service from the cellular base station using the first over-the-air delivery type in accordance with the first configuration information;
receiving second configuration information from the cellular base station, wherein the second configuration information is associated with a second over-the-air delivery type for the multicast service, wherein the second configuration information includes information indicative for switching delivery of the multicast service from the first over-the-air delivery type to the second over-the-air delivery type;
providing, to the cellular base station in conjunction with said switching delivery of the multicast service from the first over-the-air delivery type to the second over-the-air delivery type, context information; and
receiving second data of the multicast service from the cellular base station using the second over-the-air delivery type in accordance with the second configuration information.

2. The baseband processor of claim 1, wherein:
the first configuration information is received prior to receiving the multicast service from the cellular base station using the first over-the-air delivery type in accordance with the first configuration information; and
the second configuration information is received after receiving the multicast service from the cellular base station using the first over-the-air delivery type in accordance with the first configuration information.

3. The baseband processor of claim 1, wherein the context information comprises a packet data convergence protocol (PDCP) status report.

4. The baseband processor of claim 1, wherein the first configuration information includes configuration of a radio link control (RLC) bearer.

5. The baseband processor of claim 1, wherein the information indicative for switching delivery of the multicast service includes a radio bearer identifier for the multicast service.

6. The baseband processor of claim 1, wherein said providing the context information is provided during a radio resource control (RRC) reconfiguration exchange with the cellular base station.

7. The baseband processor of claim 1, wherein the information indicative for switching delivery of the multicast service is service continuity information.

8. A method, comprising:
transmitting, to a wireless device, first configuration information, wherein the first configuration information is associated with a first over-the-air delivery type for a multicast service;
transmitting, to the wireless device, second configuration information, wherein the second configuration information is associated with a second over-the-air delivery type for the multicast service, wherein the second configuration information includes information indicative for switching delivery of the multicast service from the first over-the-air delivery type to the second over-the-air delivery type; and
transmitting, to the wireless device, the multicast service using the second over-the-air delivery type in accordance with the second configuration information.

9. The method of claim 8, further comprising:
transmitting, to the wireless device, the multicast service using the first over-the-air delivery type in accordance with the first configuration information.

10. The method of claim 8, wherein:
the first configuration information is transmitted prior to transmitting the multicast service using the first over-the-air delivery type in accordance with the first configuration information; and
the second configuration information is transmitted after transmitting the multicast service using the first over-the-air delivery type in accordance with the first configuration information.

11. The method of claim 8, further comprising, receiving context information from the wireless device.

12. The method of claim 11, wherein the context information comprises a packet data convergence protocol (PDCP) status report.

13. The method of claim 11, wherein the context information is received during a radio resource control (RRC) reconfiguration exchange.

14. The method of claim 8, wherein the first configuration information includes configuration of a radio link control (RLC) bearer.

15. The method of claim 8, wherein the information indicative for switching delivery of the multicast service includes a radio bearer identifier for the multicast service.

16. The method of claim 8, wherein the information indicative for switching delivery of the multicast service is service continuity information.

17. A method, comprising:
receiving first configuration information from a cellular base station of a cellular network, wherein the first configuration information is associated with a first over-the-air delivery type for a multicast service;
receiving first data of the multicast service from the cellular base station using the first over-the-air delivery type in accordance with the first configuration information;
receiving second configuration information from the cellular base station, wherein the second configuration information is associated with a second over-the-air delivery type for the multicast service, wherein the second configuration information includes information indicative for switching delivery of the multicast service from the first over-the-air delivery type to the second over-the-air delivery type;
providing, to the cellular base station in conjunction with said switching delivery of the multicast service from the first over-the-air delivery type to the second over-the-air delivery type, context information; and
receiving second data of the multicast service from the cellular base station using the second over-the-air delivery type in accordance with the second configuration information.

18. The method of claim 17, wherein:
the first configuration information is received prior to receiving the multicast service from the cellular base station using the first over-the-air delivery type in accordance with the first configuration information; and
the second configuration information is received after receiving the multicast service from the cellular base station using the first over-the-air delivery type in accordance with the first configuration information.

19. The method of claim 17, wherein the context information comprises a packet data convergence protocol (PDCP) status report.

20. The method of claim 17, wherein the first configuration information includes configuration of a radio link control (RLC) bearer.

* * * * *